(12) United States Patent
Thompson

(10) Patent No.: US 11,235,887 B2
(45) Date of Patent: Feb. 1, 2022

(54) AIRCRAFT LANDING GEAR ASSEMBLY

(71) Applicant: Airbus Operations Limited, Bristol (GB)

(72) Inventor: Robert Ian Thompson, Bristol (GB)

(73) Assignee: Airbus Operations Limited, Bristol (GB)

(*) Notice: Subject to any disclaimer, the term of this patent is extended or adjusted under 35 U.S.C. 154(b) by 490 days.

(21) Appl. No.: 16/018,358

(22) Filed: Jun. 26, 2018

(65) Prior Publication Data

US 2019/0002123 A1    Jan. 3, 2019

(30) Foreign Application Priority Data

Jun. 30, 2017    (GB) ..................................... 1710572

(51) Int. Cl.
*B64D 45/04*  (2006.01)
*B64C 25/34*  (2006.01)
(Continued)

(52) U.S. Cl.
CPC .............. *B64D 45/04* (2013.01); *B64C 25/34* (2013.01); *B64C 25/60* (2013.01); *B64C 2025/008* (2013.01)

(58) Field of Classification Search
CPC .... B64D 45/04; B64D 45/0005; B64C 25/34; B64C 25/60; B64C 2025/008; B64C 25/42; B64C 25/28; B64C 25/426
See application file for complete search history.

(56) References Cited

U.S. PATENT DOCUMENTS

| RE22,255 E | 1/1943 | Dowly |
| 3,845,919 A | 11/1974 | Jenny |

(Continued)

FOREIGN PATENT DOCUMENTS

| EP | 2 489 591 | 8/2012 |
| EP | 2 835 311 | 2/2015 |

(Continued)

OTHER PUBLICATIONS

Texas Instruments, AN-301 Signal Conditioning for Sophisticated Transducers (Rev. B), 2013, Texas Instruments, pp. 11 and 13 (Year: 2013).*

(Continued)

*Primary Examiner* — Alan D Hutchinson
*Assistant Examiner* — Andy Schneider
(74) *Attorney, Agent, or Firm* — Nixon & Vanderhye P.C.

(57) ABSTRACT

An aircraft landing gear assembly (112) including a shock absorber strut (114), a bogie (120), a link assembly (124), and a movement detector (132). The shock absorber strut includes an upper and a lower telescoping parts (118, 116), the upper part being connectable to the airframe of an aircraft and the lower part being connected to the bogie such that the bogie may adopt different pitch angles. The link assembly extends between the upper and lower telescoping parts, such that relative movement between the upper and lower telescoping parts causes relative movement between parts of the link assembly. The movement detector is arranged to detect movement of the link assembly relative to the bogie. The movement detector detects movement by sensing a change in linear displacement of, or angle between, one or more members.

19 Claims, 12 Drawing Sheets

(51) Int. Cl.
 *B64C 25/60* (2006.01)
 *B64C 25/00* (2006.01)

(56) References Cited

U.S. PATENT DOCUMENTS

| | | | |
|---|---|---|---|
| 4,454,800 A | 6/1984 | Koepper | |
| 4,648,490 A | 3/1987 | Bergloff | |
| 6,032,090 A | 2/2000 | von Bose | |
| 6,120,009 A * | 9/2000 | Gatehouse | B64C 25/60 267/64.11 |
| 6,279,854 B1 | 8/2001 | Lindahl | |
| 6,308,916 B1 | 10/2001 | Hrusch | |
| 6,792,844 B1 | 9/2004 | Gedge | |
| 7,038,443 B2 * | 5/2006 | Proksch | B82Y 35/00 324/207.18 |
| 7,193,530 B2 * | 3/2007 | Nance | B64C 25/00 244/100 R |
| 8,042,765 B1 | 10/2011 | Nance | |
| 10,640,202 B2 | 5/2020 | Vatovec | |
| 2001/0048049 A1 | 12/2001 | Carter, Jr. | |
| 2005/0000703 A1 | 1/2005 | Furuno | |
| 2005/0230887 A1 | 10/2005 | Martinez | |
| 2007/0235585 A1 * | 10/2007 | Nance | G08B 21/00 244/100 R |
| 2008/0319698 A1 * | 12/2008 | Chen | G01G 19/12 702/101 |
| 2009/0050736 A1 | 2/2009 | Bennett | |
| 2009/0210105 A1 | 8/2009 | Lusby et al. | |
| 2009/0261206 A1 | 10/2009 | Alvi | |
| 2010/0288878 A1 | 11/2010 | Bennett | |
| 2012/0126055 A1 | 5/2012 | Lindahl | |
| 2012/0209502 A1 * | 8/2012 | Nichols | B62D 53/0871 701/124 |
| 2012/0211600 A1 * | 8/2012 | Mellor | B64C 25/00 244/100 R |
| 2012/0232723 A1 * | 9/2012 | Nance | B64C 25/00 701/5 |
| 2015/0101480 A1 * | 4/2015 | Luce | B64C 25/18 92/61 |
| 2015/0266592 A1 * | 9/2015 | Mellor | B64C 25/00 701/16 |
| 2015/0344150 A1 * | 12/2015 | Duncan | B64C 25/58 701/3 |
| 2015/0367933 A1 * | 12/2015 | Li | F16F 9/0209 701/3 |
| 2016/0101877 A1 | 4/2016 | Shepherd | |
| 2016/0375993 A1 * | 12/2016 | Schmidt | B64C 25/62 244/102 A |
| 2018/0043998 A1 | 2/2018 | Luce | |
| 2018/0050816 A1 * | 2/2018 | Yakobov | B64D 45/0005 |
| 2018/0058985 A1 | 3/2018 | Luce | |
| 2018/0170516 A1 | 6/2018 | Niemiec | |
| 2018/0170531 A1 * | 6/2018 | Cokonaj | B64C 25/58 |
| 2019/0094979 A1 * | 3/2019 | Hall | G06F 3/0346 |
| 2019/0270515 A1 | 9/2019 | Rogiers | |

FOREIGN PATENT DOCUMENTS

| | | |
|---|---|---|
| EP | 3 059 165 | 8/2016 |
| FR | 2498278 | 7/1982 |
| GB | 2 453 554 | 4/2009 |
| WO | 2014162032 | 10/2014 |

OTHER PUBLICATIONS

Combined Search and Examination Report for GB 1710572.7 dated Jan. 2, 2018, 6 pages.
Combined Search and Examination Report for GB1710573.5, dated Jan. 2, 2018, 6 pages.
Pipe Flow Measurement—Venturi Flow Meter, 2012, Wermac.org, http://www.wermac.org/specials/venturiflow/metereter.html (Year: 2012), 8 pages.
Combined Search and Examination Report for GB 1710569.3 dated Jan. 2, 2018, 7 pages.

* cited by examiner

AIRCRAFT LANDING GEAR ASSEMBLY

CROSS RELATED APPLICATION

This application claims priority to United Kingdom Patent Application GB 1710572.7 filed 30 Jun. 2017, the entirety of which is incorporated by reference.

BACKGROUND OF THE INVENTION

The present invention concerns aircraft landing gear. More particularly, but not exclusively, this invention concerns an apparatus and a method for detecting aircraft weight on wheels during an aircraft landing. The invention also concerns a wing assembly and an aircraft including such a landing gear assembly.

FIG. 2 shows a typical prior art landing gear assembly 12 for an aircraft. The landing gear assembly 12 comprises a shock absorber strut 14 comprising a piston 16 received within a cylinder 18. Cylinder 18 is connected to the airframe of the aircraft. Piston 16 is at its lower end pivotally connected to a bogie 20. The bogie 20 can thereby adopt different pitch angles relative the shock absorber strut 14. A pitch trimmer 24 controls the position of the bogie 20 relative to the shock absorber strut 14 in flight. A plurality of wheels 22 are mounted on the bogie 20.

The in-flight angle of the bogie relative to the shock absorber strut (the "trail angle") is typically set by the pitch trimmer to facilitate the retraction of the landing gear into the available space within the wheel well in the airframe. The trail angle may mean that during landing all the wheels do not touch the ground at the same time. For example, in FIG. 2 it can be seen that should the aircraft travelling in direction F land on the ground G, the rear wheel 22a will touch down in advance of the front wheel 22b.

There are various prior art methods of detecting aircraft weight on wheels during landing. The detection of weight on wheels can act as a trigger condition for the initiation of various aircraft retardation devices (for example brakes, lift dumpers, engine reverse thrust). Thus it can be understood that the sooner aircraft weight on wheels can be detected, potentially the sooner the aircraft can be slowed and, if required, brought to a stop.

One such prior art method of detecting weight on wheels involves detecting shock absorber compression. The trail angle, and the fact that the bogie is pivotally connected to the shock absorber, may mean that the shock absorber does not immediately compress, despite one or more of the wheels having touched down (i.e. despite there being weight on those wheels). For example, with reference to FIG. 2, in a landing of the aircraft on the ground G, the rear wheel 22a will touch down in advance of the front wheel 22b. However it will not be until be until there is also weight going through the front wheel 22b, and sufficient weight going through the shock absorber 14, that weight on wheels will be detected using this method. The minimum amount of weight going through the shock absorber to cause compression is known as the "breakout load". The magnitude of the breakout load is a result of (i) a minimum pressure needed to keep the seals energised within the shock absorber and (ii) the overall shape of the shock absorber spring curve. This may result in a breakout load of several tonnes. Particularly for a low sink rate, low weight landing, the shock absorbers may not breakout immediately. This may result in late weight on wheels detection and therefore late braking in these circumstances.

Another prior art method of detecting weight on wheels involves detecting spin-up of the wheels of the aircraft. In certain conditions, for example for landings on icy runways or runways contaminated with oil, there may be a delay in the wheels spinning up after they have touched down. Therefore there may again be a delay in detecting weight on wheels.

As mentioned above, the in-air trail angle is typically set by the pitch trimmer to facilitate the retraction of the landing gear into the available space within the wheel well in the airframe. Pitch trimmers may be active or passive. Passive trimmers usually provide a force that orientates the bogie to a particular position. This can be achieved by applying a hydraulic pressure to a piston. In this case no position feedback or control function is required. Active trimmers can control the orientation of the bogie such that it can be made to adopt one of a number of positions.

In a certain prior art landing gear assembly there is provided a proximity sensor having a discrete output that indicates whether or not the bogie is at the correct trail angle to permit landing gear retraction. Movement away from this position could, during landing, be used to detect weight on wheels. However, should the pitch trimmer fail and allow the bogie to drift away from the correct trail angle during flight, aircraft weight on wheels could not be detected using this method. Therefore use of the proximity sensor in such a way would not be a sufficiently reliable method for detecting aircraft weight on wheels. Further, this method may also fail to detect weight on wheels should the aircraft land square on the bogie, such that all wheels contact the ground at once and there is limited movement of the bogie relative to the shock absorber strut.

The present invention seeks to mitigate one or more of the above-mentioned problems. Alternatively or additionally, the present invention seeks to provide an improved apparatus for detecting aircraft weight on wheels.

SUMMARY OF THE INVENTION

The present invention provides, according to a first aspect, an aircraft landing gear assembly comprising: a shock absorber strut, a bogie, a link assembly, and a movement detector. The shock absorber strut comprises an upper and a lower telescoping parts, the upper part being connectable to the airframe of an aircraft and the lower part being connected to the bogie such that the bogie may adopt different pitch angles. The link assembly extends between the upper and lower telescoping parts, such that relative movement between the upper and lower telescoping parts causes relative movement between parts of the link assembly. In use the link assembly and the bogie have an initial relative position at a given time, and the movement detector is arranged to detect movement of the link assembly relative to the bogie irrespective of the initial relative position of the link assembly and the bogie.

Embodiments of the aircraft landing gear assembly of the first aspect may provide several benefits over the aforementioned prior art. Firstly, the assembly does not rely only on shock absorber compression before weight on wheels can be detected. Similarly, the assembly does not rely only on the movement of the bogie relative to the shock absorber strut for detection of weight on wheels. The assembly furthermore need not rely on the pitch trimmer bringing the bogie to a predetermined position in order to detect aircraft weight on wheels during landing, because the movement detector can detect movement of the link assembly with respect to the bogie regardless of the initial position of the link assembly and the bogie. The aircraft landing gear assembly according to the present invention advantageously detects aircraft weight on wheels due to compression of the shock absorber (which causes movement of the link assembly) and/or a change in trail angle during landing, in spite of failure conditions of the pitch trimmer.

It will be appreciated that there may be certain arrangements of the assembly in which no relative movement of the link assembly and bogie occurs at a particular landing angle because the movement of the bogie cancels out the movement of the link assembly when the shock absorber compresses. However it has been found that the assembly can be arranged to mitigate or eliminate the possibility of this happening under most foreseeable circumstances.

The upper part (or the lower part) of the shock absorber strut may be a cylinder part. The lower part (or the upper part) of the shock absorber strut may be a piston part or a slider part. The piston part or slider part may be arranged to be received within the cylinder part. This may permit telescopic movement such that the shock absorber strut can vary in length. The length of the shock absorber strut may vary depending on the amount of load applied to the shock absorber strut in the direction of the longitudinal axis of the shock absorber strut. The internal cavity formed by the upper and lower parts of the shock absorber strut may contain gas, which may be contained under pressure. The gas may act as a spring and may at least partially support the aircraft weight when on the ground. The cavity may also contain a volume of hydraulic fluid (e.g. oil). The hydraulic fluid may be forced through restrictors to provide damping (i.e. to control the rate of movement of the slider).

The link assembly, being connected between the upper and lower telescoping parts of the shock absorber strut, is caused to move when the shock absorber strut compresses or extends. Therefore when load is applied to (or removed from) the shock absorber strut, for example during landing of an aircraft, the link assembly will be caused to move. The link assembly, the bogie and the movement detector may be so arranged that the movement detector detects relative movement, from an initial position, between the link assembly and the bogie, irrespective of the initial positions of the link assembly and the bogie. The link assembly may extend between, and be directly connected to, the upper and lower telescoping parts.

The landing gear may comprise a torque link assembly. The torque link assembly may be arranged to resist rotation of the upper part of the shock absorber strut relative to the lower part of the shock absorber strut, about the longitudinal axis of the shock absorber. The landing gear may comprise a false link assembly (sometimes referred to as a slave link assembly). The false link assembly may not itself be arranged to resist rotation. The false link assembly may provide an alternative route for the electrical and hydraulic dressings that connect to wheel mounted systems (brakes, tachometers, tyre pressure sensors etc.) segregated from the route available over the torque link assembly. The link assembly (whose relative movement is detected) may be either the torque link assembly or the false link assembly. In some embodiments the movement of more than one link assembly relative to the bogie may be detected.

The movement detector and/or link assembly may be positioned fore or aft of the shock absorber strut. Positioning the movement detector and/or link assembly aft of the shock absorber strut may be advantageous as it may at least be partially shielded by the shock absorber strut during flight, for example against bird strike.

The link assembly may comprise an upper arm and a lower arm. The upper arm may be pivotally connected to the upper part of the shock absorber strut. The lower arm may be pivotally connected to the lower part of the shock absorber strut. The upper and lower arms may be pivotally connected to each other at a hinge location. When the shock absorber strut is compressed, the hinge location may be forced outwards and away from the shock absorber strut. The upper arm may be directly connected to the upper part of the shock absorber strut (i.e. not via any other link arms or the like). The lower arm may be directly connected to the lower part of the shock absorber strut.

The movement detector may be connected at one end to the link assembly. That end of the movement detector may be attached to the link assembly at a location that, along the length of the link assembly when at its most open, is closer to the hinge location than to the either end of the link assembly. The movement detector may be mounted to the link assembly at, or directly adjacent to, the hinge location of the link assembly. The movement detector may be mounted to the link assembly at the hinge location. For example, the upper arm may be pivotally connected to the lower arm by an axial pin extending through the upper arm and lower arm. The movement detector may be mounted at the axial pin, for example being mounted on the axial pin.

The movement detector may be arranged to detect movement of the upper arm and/or the lower arm relative to the bogie. The movement detector may be mounted to the upper arm and/or lower arm. The movement detector may be pivotally mounted at one end to the upper arm and/or lower arm. The movement detector may be mounted to the upper and/or lower arm at a location between the two ends of the upper arm and/or lower arm. The movement detector may be arranged to detect the angle of the upper arm and/or the lower arm relative to the bogie.

The bogie may comprise a bogie beam extending fore and aft. The bogie may comprise one or more axles. One or more wheels may be mounted on the one or more axles. For example, the bogie may comprise two axles, or three axles, each axle having two wheels. The shock absorber strut may be pivotally connected to the bogie. The movement detector may be mounted at one end to the bogie. The movement detector may be mounted to the bogie fore or aft of the location at which the shock absorber strut connects to the bogie.

The movement detector may comprise a member, or series of members, connected to and extending between the link assembly and the bogie. The movement detector may detect movement of one of its ends relative to the other. The movement detector may detect linear movement or rotational movement. The movement detector may comprise a cylinder and piston arrangement pivotally connected at one end to the link assembly and at the other end to the bogie. Relative movement of the link assembly and the bogie may cause the piston to move within the cylinder. Alternatively or additionally the movement detector may comprise a pair of members pivotally connected at one end to the link assembly and at the other end to the bogie. Relative movement of the link assembly and the bogie may cause a change in angle between the two members.

The movement detector may provide an output, for example an output signal, in dependence on movement of the torque link relative to the bogie. The output signal may be one that indicates in a binary manner whether or not there has been detection of movement of the torque link relative to the bogie. It may be the case that detection of movement by the movement detector is deemed to have occurred when the movement detector provides an output. A control system may be provided to interpret the output in order to determine whether movement has been detected. The output may be in the form of an electrical signal. The control system may comprise, or consist of, a signal processor. The control system may be integral to the movement detector. The control system may be remote from the movement detector. The control system may be an aircraft control system, for example being located in another part of the aircraft remote from the landing gear. The control system may provide an energising current and/or voltage to the sensors such that they can function. It will be understood that the control system may process the signals received from the sensor and may output a modified signal. The control system need not necessarily have control of any particular external or physical operations.

The movement detector may be arranged to output a particular form of signal, for example a pulse, upon movement of the link assembly relative to the bogie. The control system may arranged to determine that movement has been detected due to receipt of that particular signal.

The movement detector may be arranged to detect movement when the movement, or rate of movement, of the link assembly relative to the bogie exceeds a threshold amount. The movement detector may be arranged to output a signal, for example a pulse, when the movement, or rate of movement, of the link assembly relative to the bogie exceeds a threshold amount.

The movement detector may be arranged to detect the position of the link assembly relative to the bogie. The movement detector may be arranged to output a signal which corresponds to the position of the link assembly relative to the bogie. The control system may arranged to determine that movement has been detected due to a change in the signal.

The movement detector may be arranged to detect the direction of movement, rate of movement and/or acceleration of the link assembly relative to the bogie. The movement detector may be arranged to output a signal from which direction of movement, rate of movement and/or acceleration can be determined. The control system may arranged to determine direction of movement, rate of movement and/or acceleration from the signal.

The speed at which the link assembly moves relative to the bogie during landing may correspond to the descent rate of the aircraft upon landing. The movement detector, when configured to determine speed of movement, may therefore also be used to determine the descent speed (i.e. the speed in the vertical direction) of the aircraft upon landing (e.g. immediately after touchdown of one or more wheels). The determination of descent speed may be made by a signal processor and/or a control system. The speed profile and/or the vertical deceleration of the aircraft during landing may also be determined.

If the aircraft descent rate during landing has exceeded a certain level, then it may be required to inspect the aircraft. In particular the landing gear assembly and/or the airframe may need to be inspected for distorted or failed parts. Typically aircraft descent rate is detected using, for example, a radar altimeter. The movement detector of the present invention may provide a more accurate measure of aircraft descent rate during landing. Therefore the present invention provides a way to determine, with more confidence, whether there is a need to inspect the aircraft. This may reduce the amount of unnecessary (and often time consuming) aircraft inspections.

According to another aspect of the invention there may be provided a method of determining the rate of descent of an aircraft upon landing. The method may comprise a step of determining, on the basis of the speed at which the link assembly moves relative to the bogie, the rate of descent of the aircraft. The speed at which the link assembly moves relative to the bogie may be determined using a movement detector according to the present invention. There may be a step of determining, on the basis of the rate of descent, whether to inspect the aircraft. According to another aspect of the invention there may be a method of using the movement detector in the determination of the rate of descent of an aircraft upon landing.

It will be understood that the signal may take various forms. For example the signal could be a direct or alternating current. Movement of the link assembly relative to the bogie could cause a temporary change in the voltage, current and/or frequency of the signal. Alternatively or additionally, the voltage, current and/or frequency could be related to the position of the link assembly relative to the bogie. In other embodiments the signal could be an analogue or digital waveform which encodes information, for example a true/false indication or a numerical value, for example a measurement of distance or angle.

The movement detector, or alternatively the associated control system, may be arranged to generate a binary output indicating whether or not aircraft weight on wheels is detected. For example the output may be an "on" signal when aircraft weight on wheels is detected and an "off" signal when aircraft weight on wheels is not detected.

The movement detector may comprise one or more sensors. The sensors may sense an action which occurs in response to movement of the link assembly relative to the bogie beam. The sensors may sense the position of one or more elements. The position of those elements may correspond to the position of the torque link relative to the bogie beam. The output from the sensors may be used to determine whether the link assembly has moved relative to the bogie. The output may be in the form of an electrical signal. The control system may be configured to interpret the signal from the sensors in order to determine whether movement has been detected.

The sensors may be arranged such that they provide an output, from which movement of the link assembly relative to the bogie can be determined to have occurred, when the movement, or rate of movement, exceeds a threshold amount.

The same sensors, or one or more additional sensors, may also provide an output which may be used to determine direction of movement, rate of movement and/or acceleration of the link assembly relative to the bogie. The control system may also be configured to interpret the signal from the sensors in order to determine the direction of movement, rate of movement and/or acceleration.

By way of example, the movement detector may comprise a sensor arranged to sense the pressure of a fluid within the cylinder and piston arrangement (of the movement detector) mentioned above. Movement of the link assembly relative to the bogie may cause the pressure of the fluid to increase and/or decrease. When the link assembly moves relative to the bogie the output signal from the sensor may therefore comprise a pulse generated due to the change in pressure. The control system may thereby determine that movement has been detected due to receipt of that pulse in the signal.

By way of example, the movement detector may comprise a sensor arranged to sense the rate of flow of a fluid. Movement of the link assembly relative to the bogie may cause fluid to flow from one location to another. When the link assembly moves relative to the bogie the output signal from the sensor may correspond to a non-zero rate of flow. The control system may thereby determine that movement has been detected due to a change in the signal received.

By way of another example, the movement detector may comprise a sensor arranged to sense the angle between the pair of (pivotally connected) members mentioned above of the movement detector. When the link assembly moves relative to the bogie the output signal from the sensor changes. The control system may thereby determine that movement has been detected due to a change in the signal received.

The landing gear assembly may comprise a pitch trimmer arranged to move the bogie so as to adopt a particular trail angle. The pitch trimmer may be active or passive. The pitch trimmer may be provided in addition to the movement detector. Alternatively, the movement detector may be formed as a part of the pitch trimmer.

The movement detector may comprise a sensor arranged to sense a change in angle, the angle being dependent on the position of the link assembly relative to the bogie. The sensor may provide an absolute measurement of angle and/or a measurement of angular change.

The movement detector may comprise a member rotatably mounted to the link assembly (for example to the lower or upper arm) or bogie. Movement of the link assembly relative to the bogie may cause a change in the angle of the member relative to the link assembly or bogie. The angle of the member relative to the link assembly or bogie may therefore be an indication of the position of the link assembly relative to the bogie. The movement detector may comprise a sensor arranged to sense the change in the angle of the member relative to the link assembly or bogie. The sensor may comprise a Rotary Variable Displacement Transducer (also known as a Rotary Variable Differential Transformer or RVDT).

The movement detector may comprise a first member rotatably mounted to a second member. The second member may be rotatably mounted to the link assembly (for example to the lower or upper arm) or bogie. Movement of the link assembly relative to the bogie may cause a change in the angle of the first member relative to the second member. The angle of the first member relative to the second member may therefore be an indication of the position of the link assembly relative to the bogie. The movement detector may comprise a sensor arranged to sense the change in the angle of the first member and second member. The sensor may comprise a rotary variable displacement transducer.

The movement detector may comprise a sensor arranged to sense a change in linear displacement, the linear displacement being dependent on the position of the link assembly relative to the bogie. The sensor may provide an absolute measurement of linear displacement and/or a measurement of a change in linear displacement.

The movement detector may comprise a first member slidably mounted to a second member. The first member may be a slider, for example a piston, and the second member may be a cylinder, the slider being slidable within the cylinder. Movement of the link assembly relative to the bogie may cause a change in the linear displacement of the first member relative to the second member. The linear displacement of the first member relative to the second member may therefore be an indication of the position of the link assembly relative to the bogie. The movement detector may comprise a sensor arranged to sense the change in linear displacement of the first member and second member. The sensor may comprise a linear variable displacement transducer (also known as a Linear Variable Differential Transformer or LVDT). The slider and cylinder may be parts of the LVDT. The landing gear assembly may comprise a two or more movement detectors. Duplication of the movement detectors may provide improved system reliability in case of failure of, or damage to, one of the movement detectors. One movement detector may be provided in front of the shock absorber strut and one aft of the shock absorber strut. Alternatively or additionally, the two or more movement detectors may be provided on the same mechanical attachments to the bogie and link assembly.

The present invention provides, according to a second aspect, a method of detecting aircraft weight on wheels during a landing of an aircraft. The aircraft comprises a control system and a landing gear assembly. The landing gear assembly comprises: a shock absorber strut, a bogie, a link assembly, and a movement detector. The shock absorber strut comprises an upper and a lower telescoping parts, the upper part being connected to the airframe of the aircraft and the lower part being connected to the bogie such that the bogie may adopt different pitch angles. The link assembly extends between the upper and lower telescoping parts, such that relative movement between the upper and lower telescoping parts causes relative movement between parts of the link assembly. The bogie supports at least one wheel on at least one axle. In accordance with the method, the link assembly has an initial position relative to the bogie at a point in time that is after the landing gear assembly has been deployed for landing and before the aircraft has touched down. The method comprises a step of the link assembly moving relative to the bogie during touchdown of the least one wheel. The method comprises a step of the movement detector detecting the movement of the link assembly relative to the bogie, irrespective of the initial position. The method comprises a step of the control system receiving a signal from the movement detector. The method comprises a step of the control system determining, on the basis of the signal, that there is aircraft weight on wheels.

The landing gear assembly may be a landing gear assembly according to the first aspect of the invention and may incorporate any features set out in relation to the first aspect.

The step of detecting the movement of the link assembly relative to the bogie may comprise the movement detector providing an output from which it can be determined that the torque link has moved relative to the bogie. The control system is in communication with the movement detector such that it receives a signal corresponding to the output.

The step of detecting the movement of the link assembly relative to the bogie may comprise generating a particular form of signal, for example a pulse, upon movement of the link assembly relative to the bogie. The control system may determine weight on wheels due to receipt of the particular form of signal. The step of detecting the movement of the link assembly relative to the bogie may comprise generating the particular form of signal when the movement, or rate of movement, of the link assembly relative to the bogie exceeds a threshold amount.

The step of detecting the movement of the link assembly relative to the bogie may comprise generating a signal which corresponds to the position of the link assembly relative to the bogie, the signal changing due to the change in the position of the link assembly relative to the bogie. The signal received by the control system may thereby comprise the indication of the position of the link assembly relative to the bogie. The control system may determine weight on wheels due to the change in the signal received.

The movement detector may comprise a sensor arranged to sense a change in angle and/or a change in linear displacement. The signal which corresponds to the position of the link assembly relative to the bogie may therefore be a signal corresponding to a measurement of angle and/or linear displacement. The step of detecting the movement of the link assembly relative to the bogie may comprise detecting a change in angle and/or linear displacement.

The method may comprise generating a signal which contains information on the direction of movement, rate of movement and/or acceleration of the link assembly relative to the bogie. The control system may determine the direction of movement, rate of movement and/or acceleration from the signal.

The step of detecting movement of the link assembly relative to the bogie may comprise detecting movement of the link assembly away from its initial position relative to the bogie. The initial position may correspond to a measurement of angle and/or linear displacement.

The initial position of the link assembly relative to the bogie may be at a point in time after the landing gear assembly has been deployed for landing and before the aircraft has touched down. The initial position of the link assembly relative to the bogie may be the position of the link assembly relative to the bogie at a point in time when the aircraft is at a predetermined altitude above ground level. The method may include a step of the control system ascertaining the position of the link assembly relative to the bogie at a predetermined altitude above ground level. The altitude may be determined by, for example, a radar altimeter. The initial position of the link assembly relative to the bogie may be the position of the link assembly relative to the bogie when the aircraft is at a predetermined time prior to an estimated time of touch down. The method may include a step of the control system ascertaining the estimated time of touchdown. The initial position of the link assembly relative to the bogie may be the position of the link assembly relative to the bogie when the aircraft is at a predetermined position. The position may be determined by the aircraft positioning system, for example using GPS. The location may be, for example, the runway threshold.

The method may comprise zeroing the movement detector such that the initial position of the link assembly relative to the bogie corresponds to a zero value. The zeroing may comprise the control system assigning a zero value to a level, value, amount, etc. of the signal. For example, a zero value may be assigned to a particular amount of voltage. It may be that the zeroing of the movement detector is performed electronically in a control system by recording a value that corresponds to the initial position of the link assembly relative to the bogie, and treating that recorded value as the zero value, without the control system actually converting it to a value equal to zero.

The movement detector may comprise a cylinder and piston arrangement. One end of the movement detector, for example one end of the cylinder, may be connected to the link assembly. An opposing end of the movement detector, for example a free end of the piston rod, may be connected to the bogie.

The step of the link assembly moving relative to the bogie during touchdown might include the point on the link assembly to which the cylinder is attached moving towards (or away from) the point on the bogie to which the piston rod is attached. The movement of the link assembly with respect to the bogie may thus lead to the piston being moved into (or out of) the cylinder. This in turn may result in compression of a chamber within the cylinder. The pressure of fluid in the chamber may therefore rise.

The increase in pressure may be detected by a pressure transducer which is in communication with the control system. The control system may therefore be receiving a signal from the pressure transducer which corresponds to the pressure detected by the pressure transducer. Once the pressure has reached a predetermined level the control system may determine, on the basis of the pressure signal from the pressure transducer, that the movement of the bogie relative to the link assembly is sufficient for it to be an indication of aircraft weight on wheels.

Alternatively or additionally, there may be a flow of fluid. The fluid flow may be detected by a flow sensor which is in communication with the control system. The control system may therefore be receiving a signal from the flow sensor which corresponds to the speed of fluid flow detected by the flow sensor. Once fluid flow is sensed, or has reached a predetermined level, the control system may determine, on the basis of the signal from the flow sensor, that the movement of the bogie relative to the link assembly is sufficient for it to be an indication of aircraft weight on wheels Whether there is extension or compression of the movement detector during landing may depend on the position of the movement detector, the orientation of the movement detector, and/or the trail angle.

The present invention provides, according to a third aspect, a method of slowing an aircraft, the method comprising the steps of: detecting whether there is aircraft weight on wheels according to the method of the second aspect of the invention, and deploying at least one means of slowing an aircraft when the control system determines there to be aircraft weight on wheels. The means of slowing an aircraft may, for example, include reverse thrust, lift dumpers and/or wheel braking. The method may more generally be a method of triggering the deployment of a means for slowing an aircraft.

In another aspect of the invention, there is provided an aircraft comprising a landing gear assembly according to any other aspect of the invention. The aircraft may comprise more than one landing gear assembly in accordance with the present invention. There may be one or more such landing gear assemblies located on opposite sides of the aircraft.

The aircraft may be a commercial aircraft, for example an aircraft configured to transport more than 50 passengers, for example more than 100 passengers, for example more than 200 passengers or an equivalent cargo load. The aircraft may be a commercial passenger aircraft. The aircraft may be a fixed wing aircraft.

In another aspect of the invention, there is provided a movement detector configured for use in the detection of aircraft weight on wheels. The movement detector is connectable between a bogie and a link assembly. The movement detector has a first member and a second member which, in use, move relative to each other when the link assembly moves relative to the bogie. The movement detector comprises one or more sensors arranged to output a signal in dependence on the linear displacement of the first member and the second member, or the angle between the first and second member. The movement detector may comprise any of the features set out in relation to any other aspect of the invention, particularly the first and second aspects of the invention.

In accordance with yet a further aspect of the invention, there is provided an aircraft landing gear assembly comprising: a shock absorber strut, a bogie, a link assembly, and a movement detector; wherein the shock absorber strut comprises an upper and a lower telescoping parts, the upper part being connectable to the airframe of an aircraft and the lower part being connected to the bogie such that the bogie may adopt different pitch angles; the link assembly extends between the upper and lower telescoping parts, such that relative movement between the upper and lower telescoping parts causes relative movement between parts of the link assembly; and the movement detector is arranged to detect movement of the link assembly relative to the bogie. The movement detector comprises two members connected to each other such that relative movement between the link assembly and the bogie causes relative movement of one of the two members relative to the other, and a sensor that is arranged to sense relative movement of one of the two members relative to the other and/or relative movement of one of the two members relative to the bogie or link assembly. Thus, in use, relative movement between the link assembly and the bogie is detected by the sensor. The sensor is preferably in the form of either a linear variable differential transformer (LVDT) or a rotary variable differential transformer (RVDT). In the case, where the sensor is an LVDT sensor, the two members of the movement detector may for example be arranged to contract and extend in a telescoping manner, in dependence on the relative movement between the link assembly relative to the bogie. Where the sensor is an RVDT sensor, the two members of the movement detector may for example be arranged to rotate together and apart about a pivot axis, in dependence on the relative movement between the link assembly relative to the bogie.

In another aspect of the invention there may be provided a method of determining the rate of descent of an aircraft upon landing. The method uses a landing gear assembly according to the present invention. The method comprises the steps of: the link assembly moving relative to the bogie during landing; the movement detector detecting the speed of the movement of the link assembly relative to the bogie; the control system receiving a signal from the movement detector, the signal being indicative of the speed of the movement; and a control system determining, on the basis of the signal, the rate of descent of the aircraft upon landing. The method may comprise an intermediate step or concurrent step of the control system determining the speed at which the link assembly moves relative to the bogie. There may be a step of determining, on the basis of the rate of descent, whether to inspect the aircraft. According to another aspect of the invention there may be a method of using the movement detector in the determination of the rate of descent of an aircraft upon landing.

It will of course be appreciated that features described in relation to one aspect of the present invention may be incorporated into other aspects of the present invention. For example, the method of the invention may incorporate any of the features described with reference to the apparatus of the invention and vice versa.

The term 'or' shall be interpreted as 'and/or' unless the context requires otherwise. It will be understood that phrases to the effect of "movement of component x relative to component y", "movement of component y relative to component x", "relative movement of components x and y", "movement of component x with respect to component y", etc. are equivalent, are used interchangeably, and do not imply a particular component is stationary in a particular reference frame unless otherwise stated.

Alternative embodiments of a movement detector are described and claimed in both (a) UK patent application entitled "Aircraft Landing Gear Assembly" with agent's reference "P026752 GB" and marked with the reference "12010-GB-NP" in the header of the patent specification as filed and (b) UK patent application entitled "Aircraft Landing Gear Assembly" with agent's reference "P026755 GB" and marked with the reference "12212-GB-NP" in the header of the patent specification as filed, each application having the same filing date as the present application. The contents of those applications are fully incorporated herein by reference. The claims of the present application may incorporate any of the features disclosed in that patent application. In particular, the claims of the present application may be amended to include features relating to movement detector as set forth in the claims of either of the aforementioned other patent applications.

DESCRIPTION OF THE DRAWINGS

Embodiments of the present invention will now be described by way of example only with reference to the accompanying schematic drawings of which.

DETAILED DESCRIPTION

Figure 1:
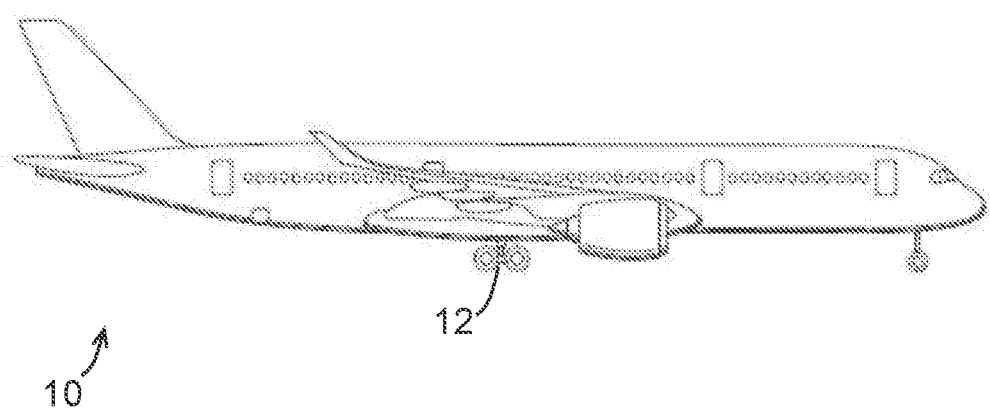
FIG. 1 shows a side view of an aircraft comprising a landing gear assembly.
Figure 2:
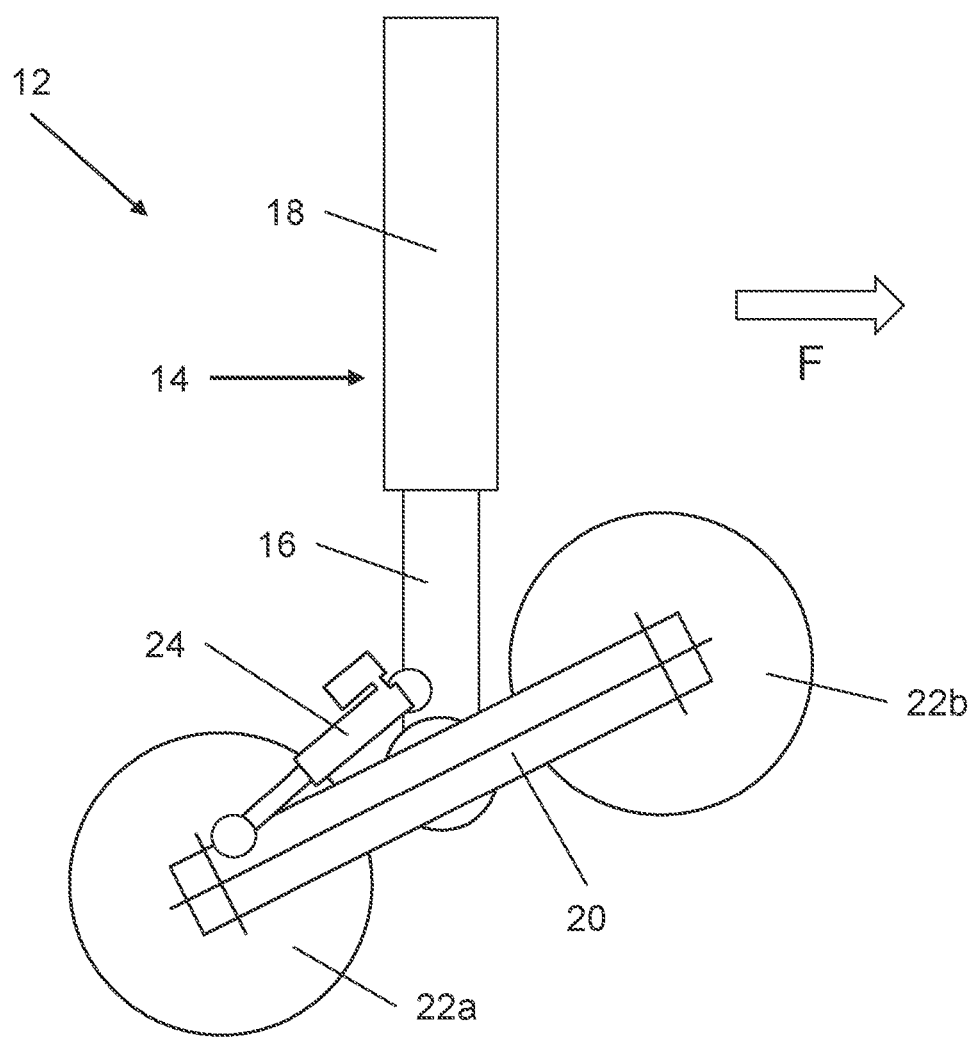
FIG. 2 shows a side view of a prior art landing gear assembly.

FIG. 1 shows an aircraft 10 comprising a main landing gear 12, the aircraft being of a type that may be employed as the aircraft with which the methods and apparatuses of any of the illustrated embodiments may be used. The aircraft 10 thus includes a landing gear assembly 12 including a bogie, which is mounted on the lower end of the landing gear leg in such a way that the bogie may adopt different pitch angles.

Figure 3:
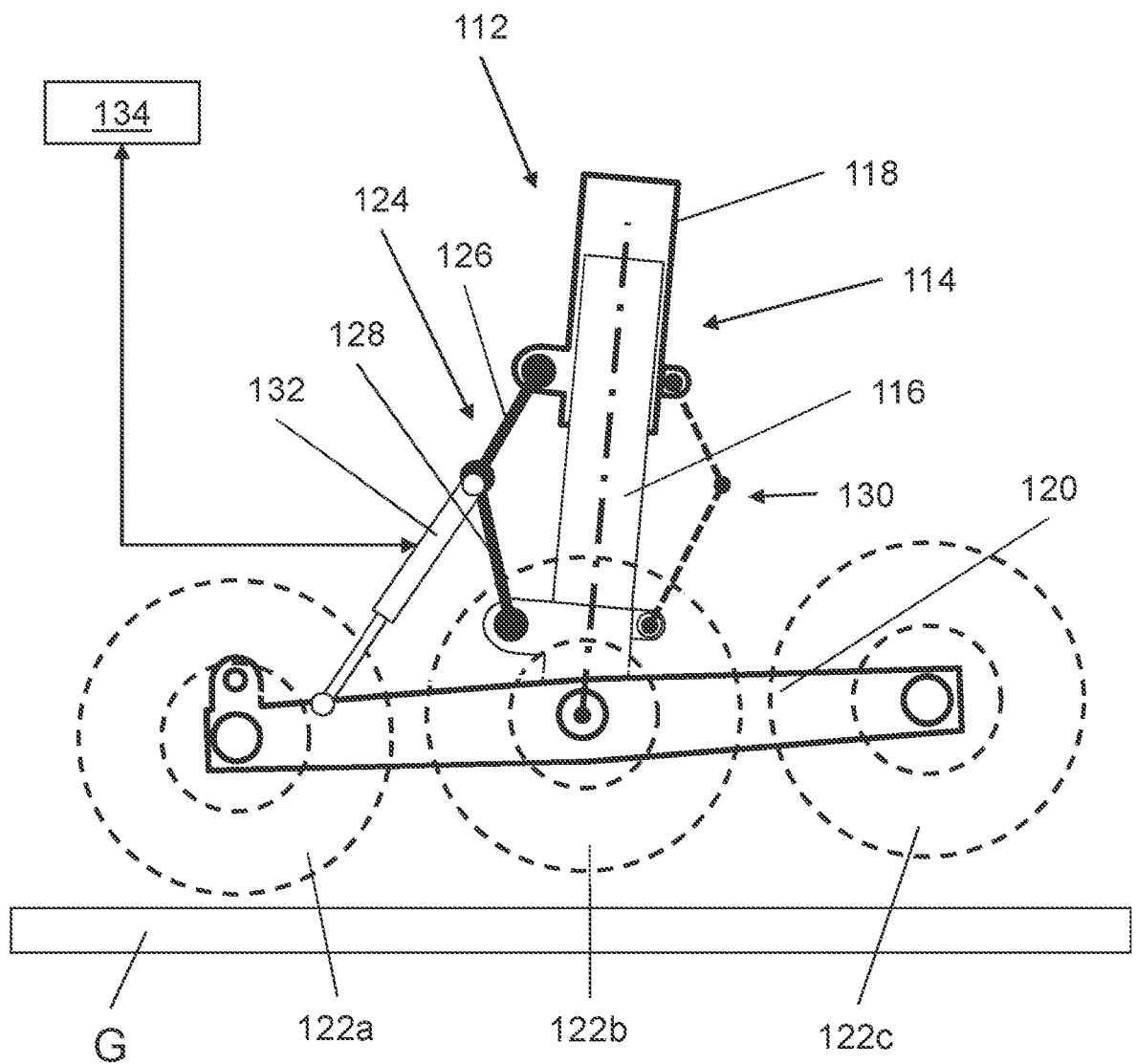
FIG. 3 shows a side view of a landing gear assembly according to a first embodiment of the invention prior to touchdown.

FIG. 3 shows an aircraft landing gear assembly 112 according to a first embodiment of the invention. The landing gear assembly 112 comprises a shock absorber strut 114 comprising a piston 116 received within a cylinder 118. Cylinder 118 is connected to the airframe of an aircraft. The direction of the front of the aircraft is indicated by arrow F. Piston 116 is at its lower end pivotally connected to a bogie 120. The bogie 120 can thereby adopt different pitch angles relative the shock absorber strut 114. A pitch trimmer (not shown) controls the position of the bogie 120 relative to the shock absorber strut 114 in flight.

A plurality of wheels 122 are mounted on the bogie 120. In this embodiment three pairs of wheels 122a, 122b, 122c are mounted to bogie 120 by three axles. A link assembly 124 in the form of a torque link connects the cylinder 118 and the piston 116 of the shock absorber strut. The link assembly 124 comprises an upper arm 126 which is pivotally mounted to the cylinder 118 and a lower arm 128 which is pivotally mounted to the piston 116. The upper arm 126 and lower arm 128 are pivotally attached to each other at a hinge location. The link assembly 124 acts against rotational movement of the piston 116/bogie 120 relative to the cylinder 118/airframe. FIG. 3 also shows a second link assembly 130 in the form of a false link.

A movement detector 132 extends between the link assembly 124 and the bogie 120. One end of the movement detector is pivotally connected to the link assembly 124 at the hinge location. An opposing end of the movement detector 132 is pivotally connected to the bogie 120 proximate the aft end of the bogie 120.

Figure 4:
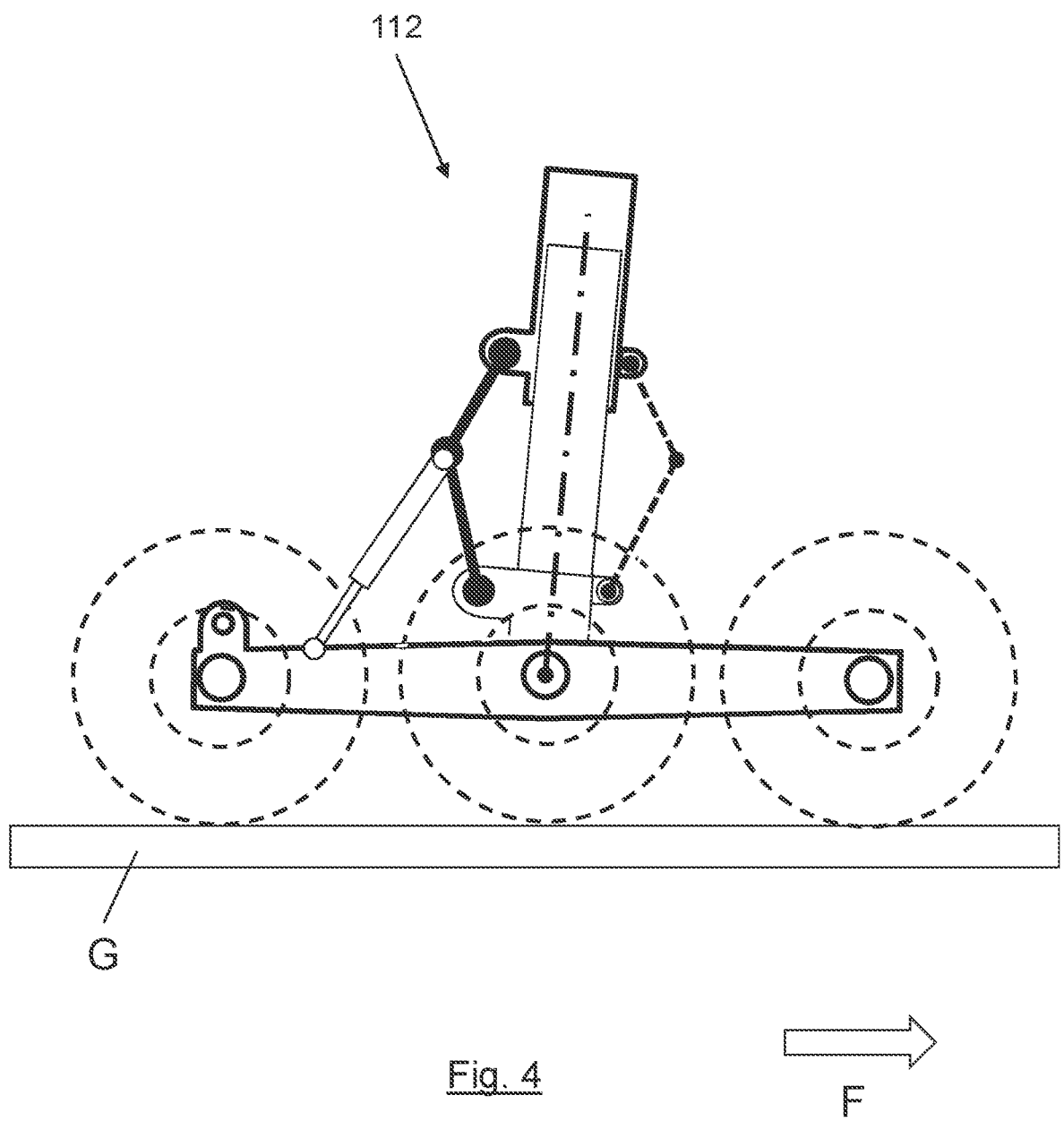
FIG. 4 shows a side view of a landing gear assembly according to a first embodiment of the invention after touchdown and before shock absorber compression.

The landing gear assembly 112 of the first embodiment has a trail angle of less than 10 degrees. During landing of the aircraft the aft pair of wheels 122a touchdown first. The bogie 120 subsequently pivots around the bottom of the shock absorber strut 114 until the centre 122b and front 122c pair of wheels have also touched down. At which point the bogie 120 is oriented substantially parallel to the ground G. In the present arrangement, the movement detector 132 is therefore compressed, as shown in FIG. 4.

Until the centre 122b and front 122c pair of wheels have touched down, there is unlikely to be enough aircraft weight going through the shock absorber strut 114 to cause it to compress. The link assembly 124 will therefore remain stationary relative to the airframe during this initial movement of the bogie 120 relative to the link assembly 124.

Figure 5:
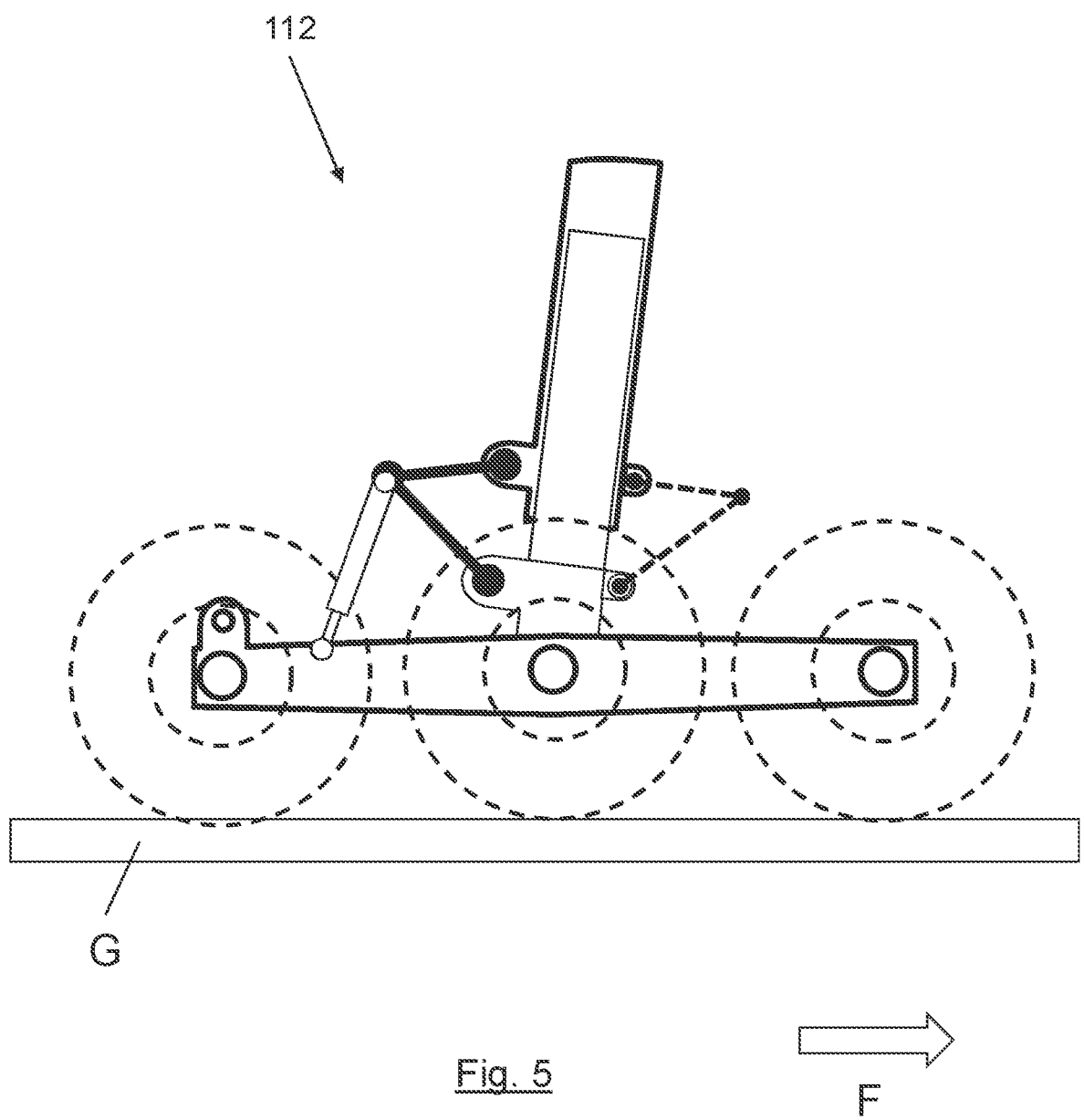
FIG. 5 shows a side view of a landing gear assembly according to a first embodiment of the invention after shock absorber compression.

Thereafter, the shock absorber strut 114 begins to compress due to the weight of the aircraft. The link assembly 124 again moves relative to the bogie 120. The hinge location of the link assembly 124 moves aft and downwards. In the present arrangement this causes further compression of the movement detector 132, as shown in FIG. 5.

Compression of the movement detector 132 is detected by sensors in the movement detector 132. The sensors are in communication with a control system 134 of the aircraft. Upon compression of the movement detector, the sensors output a signal from which the control system 134 can determine that (i) there has been movement of the link assembly relative to the bogie and (ii) therefore there is aircraft weight on wheels.

In the event of a flat landing of the bogie 120, in which all pairs of wheels 122 touchdown at substantially the same time, it will be seen that movement is still detected due to shock absorber 114 compression, despite there being no or negligible pivotal movement of the bogie 120 about the shock absorber strut 114.

The aircraft may land with a negative trail angle, such that the front pair of wheels 122c touch down before the rear pair of wheels 122a. In this case the aft portion of the bogie 120 will initially pivot away from the link assembly 124. Thus the movement detector 132 extends in length until the bogie 120 is parallel to the ground. Subsequent shock absorber 114 compression then moves the link assembly 124 back towards the point on the bogie 120 where the movement detector is attached, thus causing compression of the movement detector 132. Both such movements could be used to detect aircraft weight on wheels, and could also be used to detect the time of shock absorber 114 compression.

In alternative embodiments the movement detector 132 may be mounted between the forward portion of the bogie 120 and the false link 130. In other alternative embodiments the movement detector 132 may be connected to the lower arm 128 below the hinge location.

Figure 6:
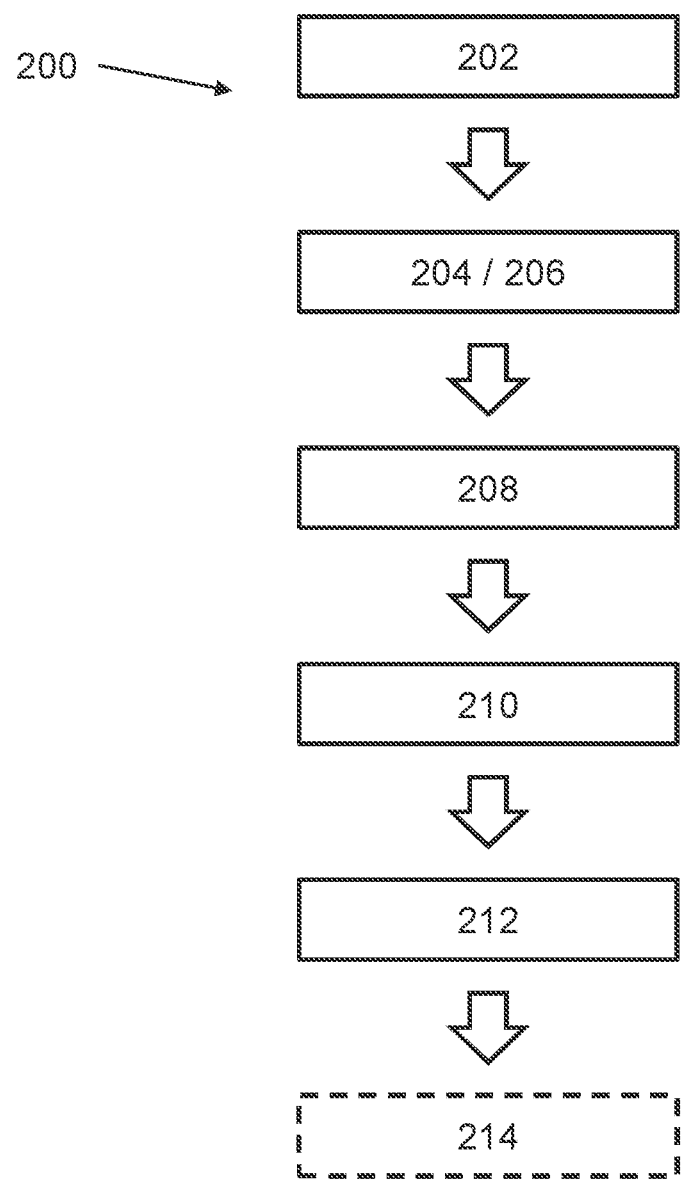
FIG. 6 shows a flow chart of a method of detecting aircraft weight on wheels according to a second embodiment of the invention.

A method 200 of detecting aircraft weight on wheels will now be described according to a second embodiment of the invention and with reference to FIG. 6. The method will be described with reference to an aircraft landing gear assembly according to the first embodiment.

The method begins subsequent to deploying (lowering) the aircraft landing gear from the aircraft wheel well. However the method may include a step of lowering the aircraft landing gear. The first step includes the control system 134 determining 202, from a radar altimeter, whether the altitude is below a predetermined value, in this example whether the altitude is below 10 feet. Provided the altitude condition is met, i.e. provided the altitude is below 10 feet, the control system 134 is configured to use the signal received from the movement detector 132 to determine whether there is aircraft weight on wheels. In embodiments in which the movement detector detects position, the method may include and additional step of zeroing the movement detector and/or a step of taking a reading of the initial position of the movement detector (which corresponds to the initial position of the link assembly 124 relative to the bogie 120).

The method subsequently comprises a step of at least one wheel of the aircraft touching down 204 on the ground and concurrently the link assembly 124 moving 206 relative to the bogie 120. Depending on the orientation of the bogie 120 relative to the ground immediately prior to touchdown, and whether there is any equipment failures for example deflation of one or more of the tyres, the link assembly 124 moves relative to the bogie 120 by (i) the bogie 120 pivoting relative to the shock absorber strut 114 and/or (ii) the shock absorber strut 114 compressing thereby causing outward movement of the link assembly 124.

The method comprises a step of detecting 208 this movement using the movement detector 132. The movement detector 132 comprises a sensor which is arranged to sense the occurrence of compression or extension of the movement detector 132. The step of detecting 208 therefore comprises sensing compression or extension of the movement detector 132 using the sensors. Detecting 208 also comprises providing an output signal on the basis of which it can be determined that movement as occurred.

The method comprises a step of the control system 134 receiving 210 the signal output from the sensors of the movement detector 132. In this embodiment the control system 134 receives a nil or baseline signal when there is no compression or extension of the moment detector 132, and a different signal during compression or extension. In embodiments the movement detector may generate a single pulse upon movement. In other embodiments the control system may receive a signal corresponding to position, for example a measurement of the travel of the ends of the movement detector.

Finally the method comprises a step of the control system 134 determining 212, on the basis of the signal received, that there is aircraft weight on wheels. In this embodiment aircraft weight on wheels is determined to have occurred when the signal received from the sensors departs from the baseline signal by a threshold amount. In other embodiments the aircraft weight on wheels is determined to have occurred when the signal received corresponds to a change in measured position.

The method of the second embodiment may be a part of a method of slowing an aircraft. In which case there is a subsequent step of deploying 214 at least one means of slowing the aircraft when the control system determines there to be aircraft weight on wheels.

Figure 7:
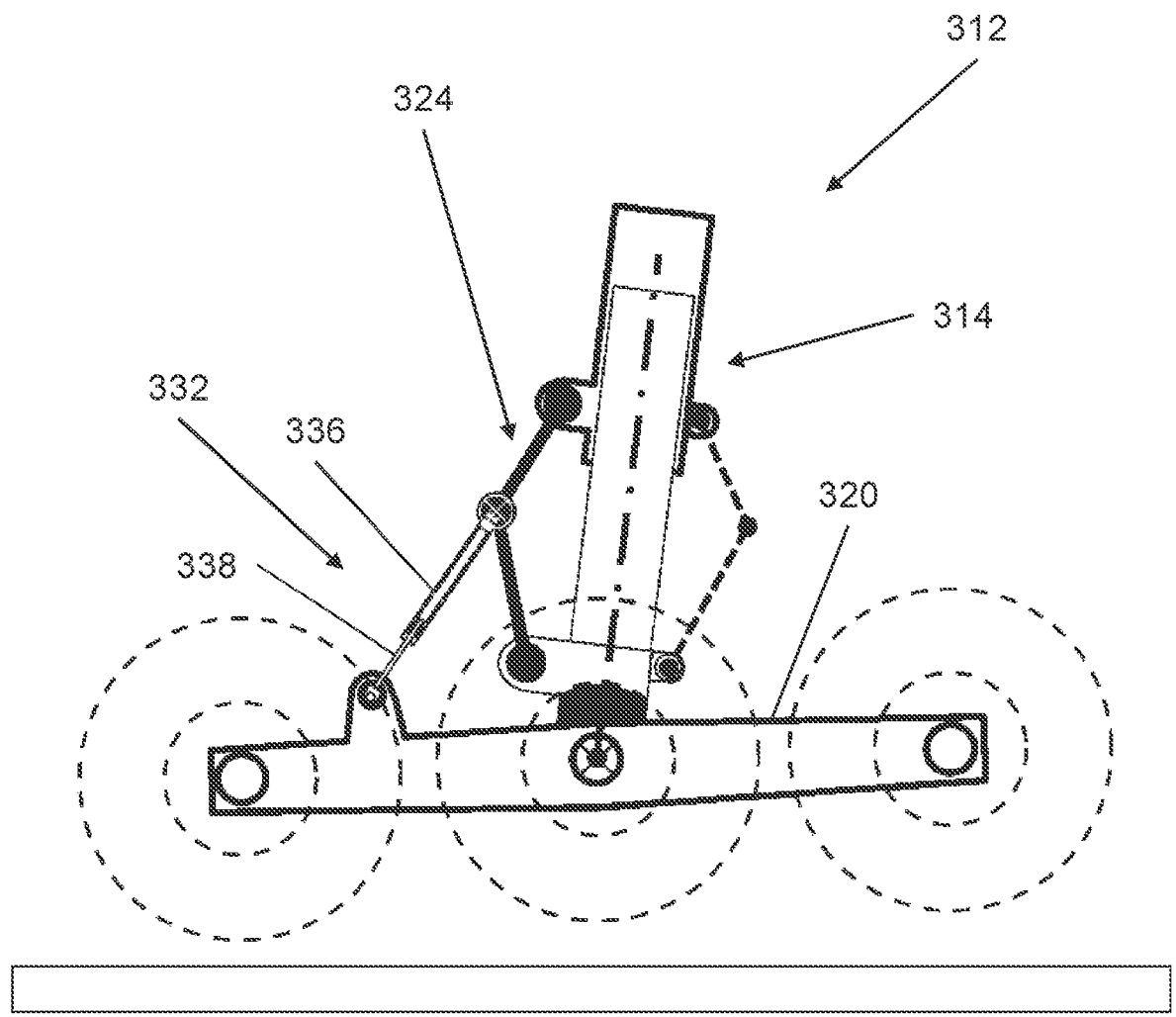
FIG. 7 shows a cross-sectional view of a landing gear assembly according to a third embodiment of the invention.

A landing gear assembly 312 according to a third embodiment of the invention will now be described with reference to FIG. 7. Landing gear assembly 312 comprises a shock absorber strut 314, link assembly 324, and bogie 320 arranged as per the first embodiment. A movement detector 332 extends between the link assembly 324 and the bogie 320.

One end of the movement detector is pivotally connected to the link assembly 324 at the hinge location. An opposing end of the movement detector 332 is pivotally connected to the bogie 320 at a location approximately half way between the aft end of the bogie 320 and the location at which the shock absorber strut 314 and bogie 320 are connected.

The movement detector 332 comprises a slider 338 which moves within a cylinder 336. Compression of the shock absorber strut 314 and clockwise movement (in the orientation as shown in FIG. 7) of the bogie 320 about the shock absorber strut 314 both cause the slider 338 to move further into the cylinder 336. Similarly, extension of the shock absorber strut 314 and anti-clockwise movement of the bogie 320 about the shock absorber strut 314 both cause the slider 338 to move further out of the cylinder 336.

Figure 8:
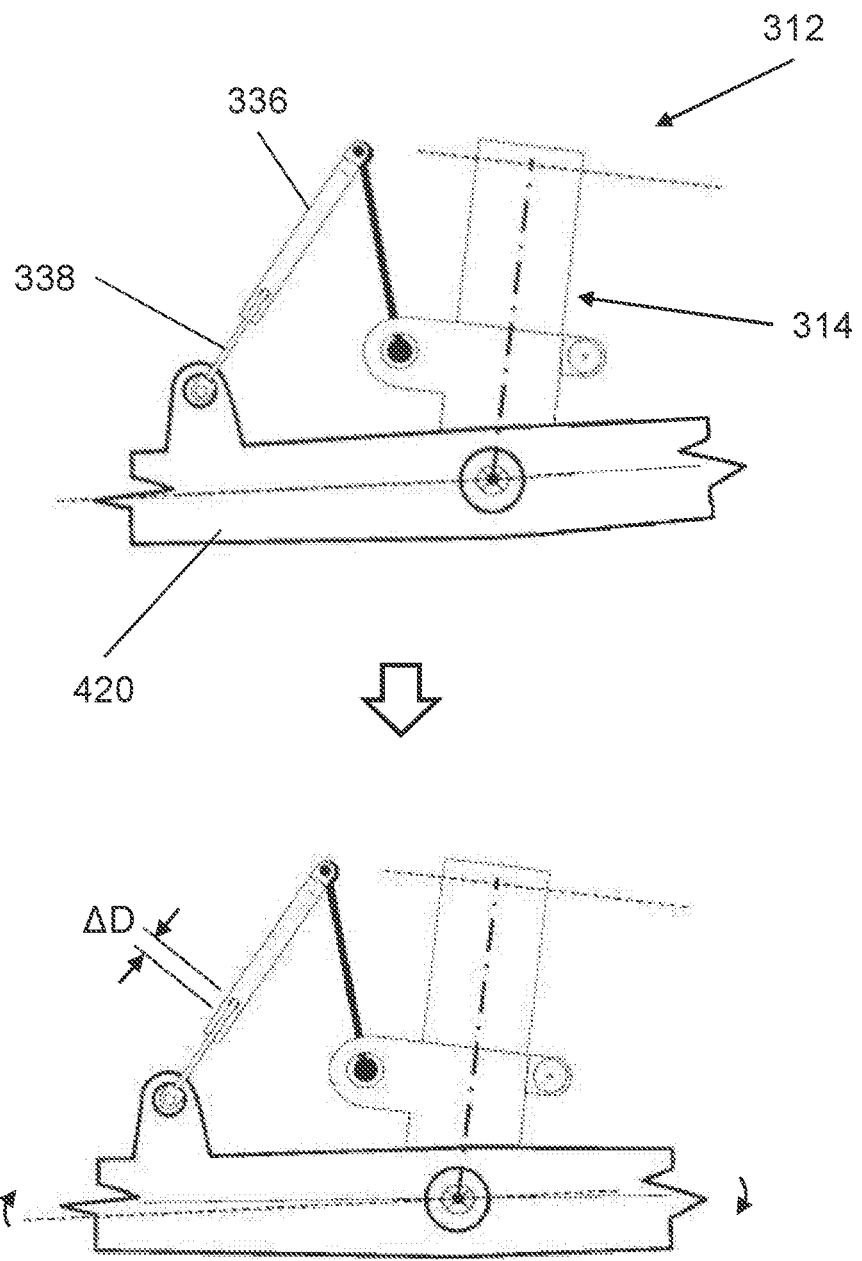
FIG. 8 shows a cross-sectional view of the change in position of the parts of the landing gear assembly of the third embodiment due to a change in trail angle.
Figure 9:
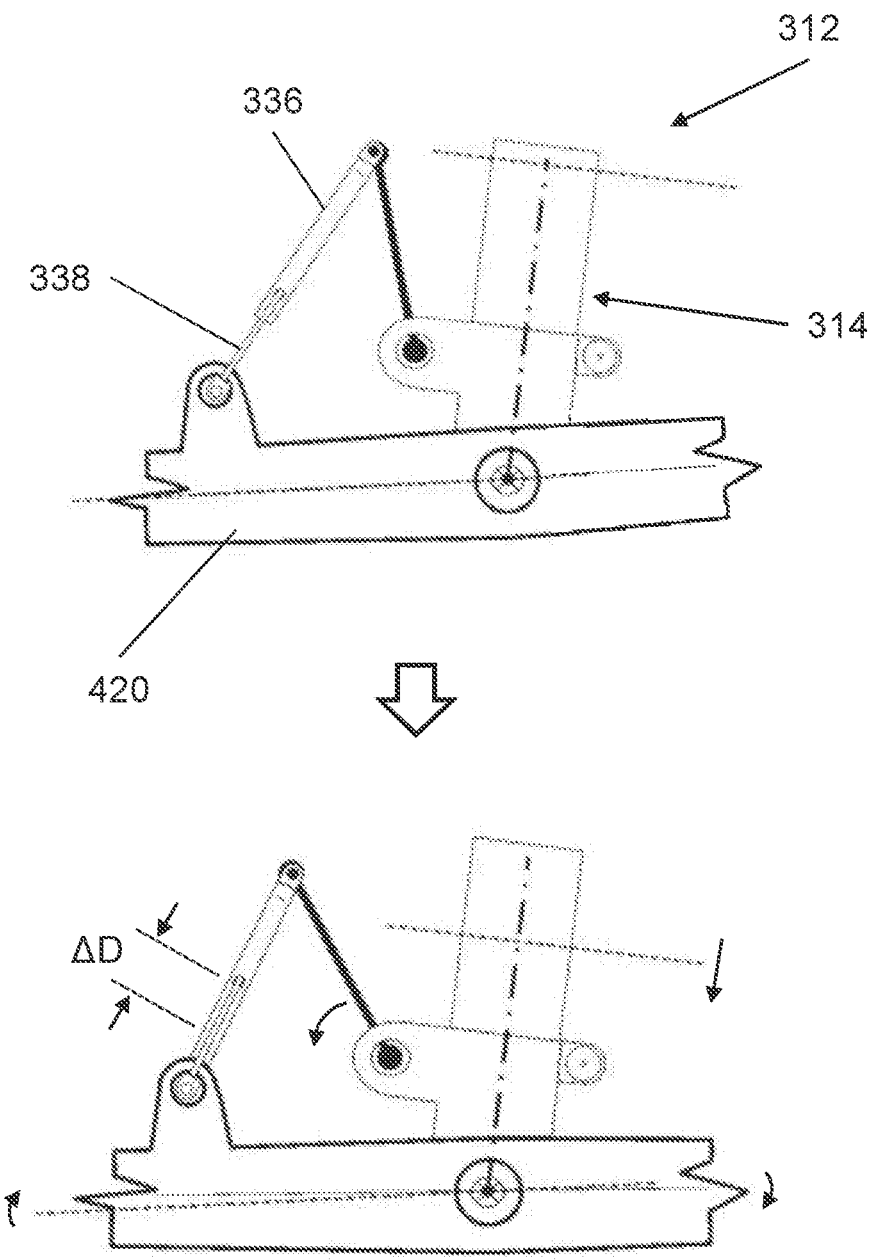
FIG. 9 shows a cross-sectional view of the change in position of the parts of the landing gear assembly of the third embodiment due to shock absorber compression.

FIG. 8 shows compression of the movement detector due to a change of the trail angle (for example due to touchdown of one or more wheels during landing). FIG. 9 shows compression of the movement detector due to a change of the trail angle and a subsequent compression of the shock absorber strut 314. In FIGS. 8 and 9 the change in the linear displacement of the slider 338 in the cylinder 336 is shown as distance ΔD.

A sensor in the form of a Linear Variable Displacement Transducer (LVDT) is arranged to sense the linear displacement (i.e. the position) of the slider 338 within the cylinder 336. The LVDT provides an output signal having a voltage which is proportional to the linear displacement. The control system can thus determine that the link assembly has moved relative to the bogie when there is a change in the voltage of the output signal.

In embodiments, the movement detector 332 and control system are calibrated such that the control system can determine the angular position of the bogie relative to the shock absorber strut for a given output signal. The angular position may be made available to other aircraft systems and/or the flight crew.

In embodiments of the method the control system stores the voltage reading, or assigns a zero value to a given voltage, when the aircraft is at a predetermined altitude (and/or predetermined location and/or at a predetermined time). The control system thereafter uses (provided the altitude, location and/or time conditions continue to be met) a change in the voltage away from the stored reading, or zero value, as an indicator that there is aircraft weight on wheels.

Figure 10:
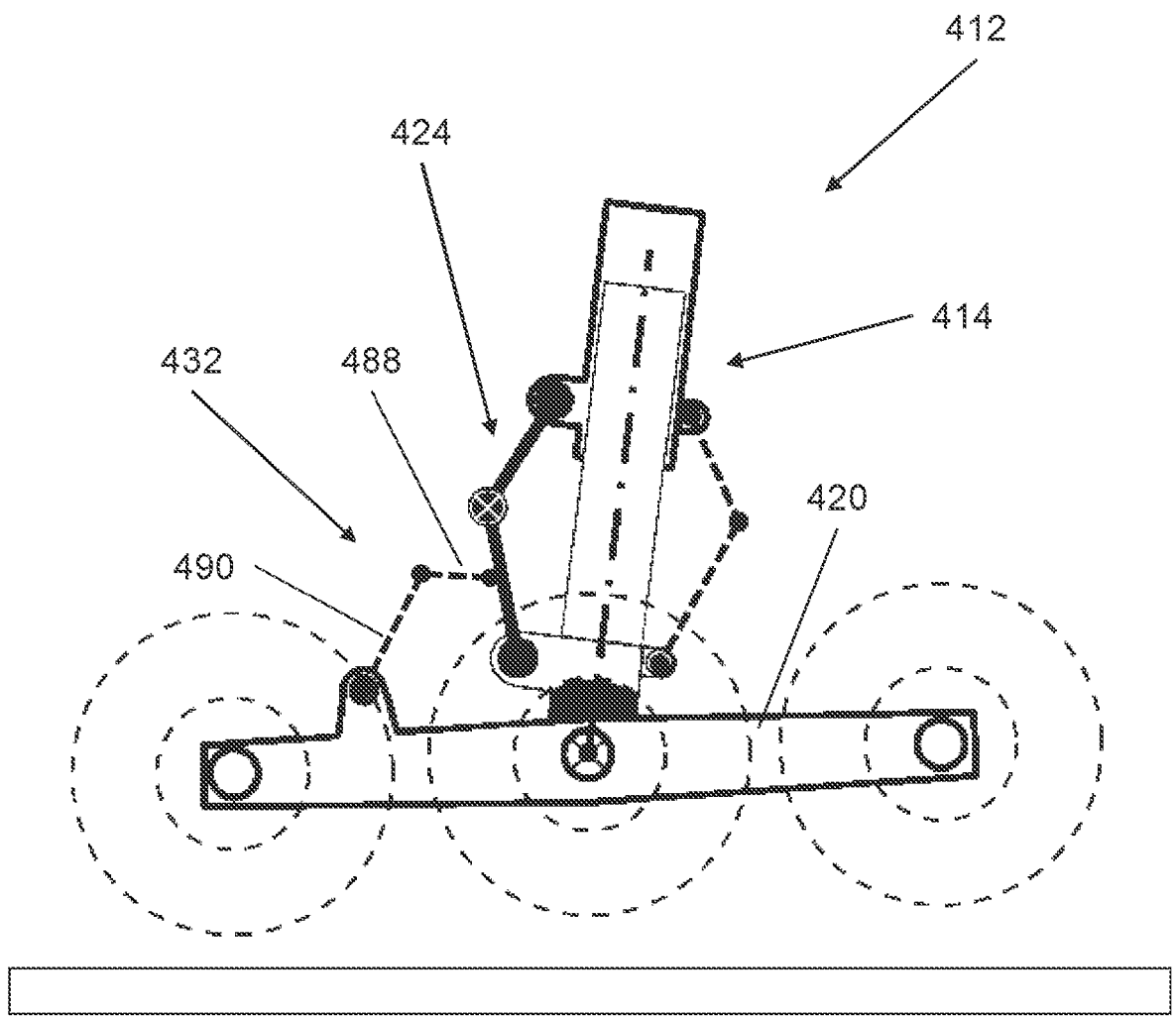
FIG. 10 shows a cross-sectional view of a movement detector according to a fourth embodiment of the invention.

A landing gear assembly 412 according to a fourth embodiment of the invention will now be described with reference to FIG. 10. Landing gear assembly 412 comprises a shock absorber strut 414, link assembly 424, and bogie 420 arranged as per the first embodiment. A movement detector 432 extends between the link assembly 424 and the bogie 420.

The movement detector 432 comprises a first member 488 pivotally mounted to the lower arm 428 of the link assembly 424. A second member 490 pivotally attached at one end to the first member 488 and at the other end to the bogie 420 at a location approximately half way between the aft end of the bogie 420 and the pivotal connection between the shock absorber strut 414 and the bogie 420.

Changes in trail angle and compression or extension of the shock absorber strut 414 each cause a change in the relative positions of the first member 488, second member 490, bogie 420 and lower arm 428. Compression of the shock absorber strut 414 and clockwise movement (in the orientation as shown in FIG. 10) of the bogie 420 about the shock absorber strut 414 cause both the angle between the first member 488 and the lower arm 428 and the angle between the first member 488 and the second member to decrease. Similarly, extension of the shock absorber strut 414 and anti-clockwise movement of the bogie 420 about the shock absorber strut 414 both cause both the angle between the first member 488 and the lower arm 428 and the angle between the first member 488 and the second member to increase.

Figure 11:
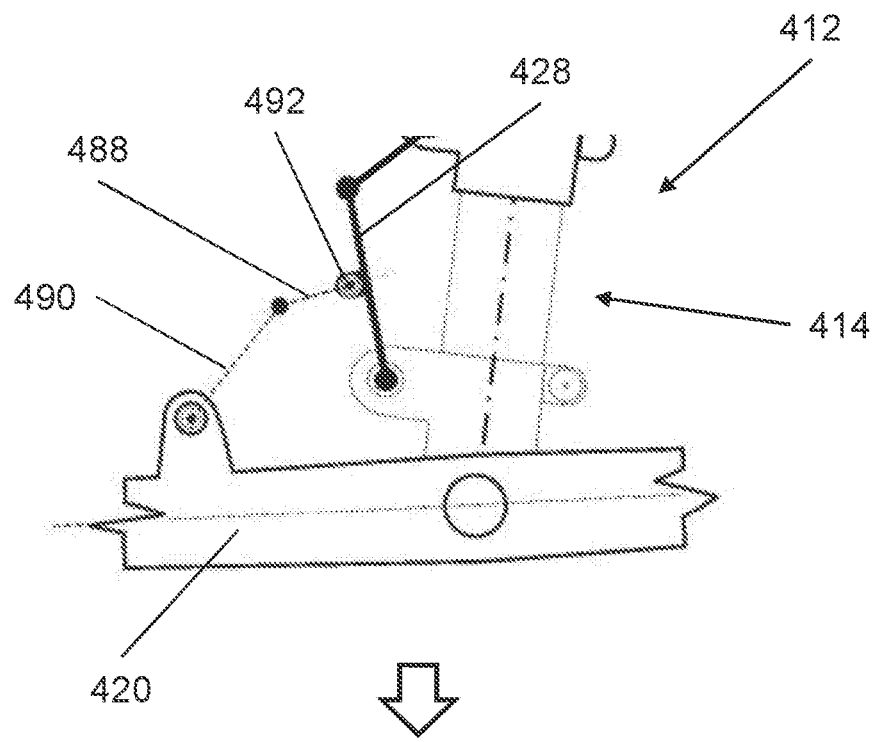
FIG. 11 shows a cross-sectional view of the change in position of the parts of the landing gear assembly of the fourth embodiment due to a change in trail angle.
Figure 11:
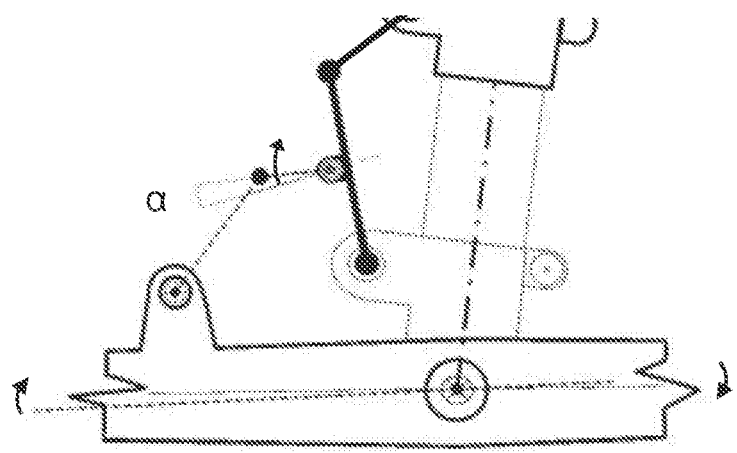
Figure 12:
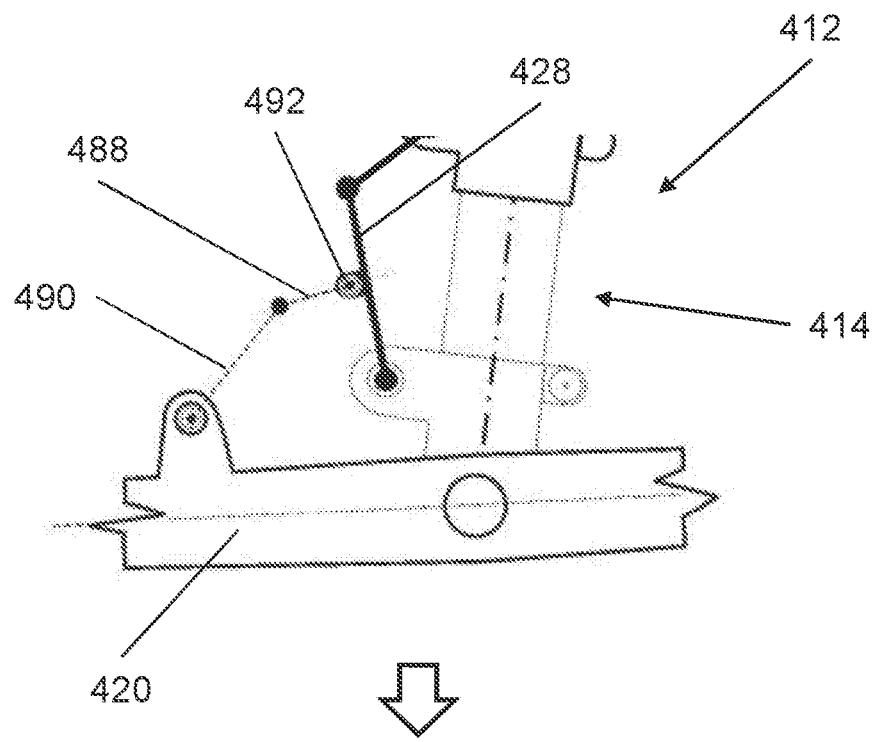
FIG. 12 shows a cross-sectional view of the change in position of the parts of the landing gear assembly of the fourth embodiment due to shock absorber compression.
Figure 12:
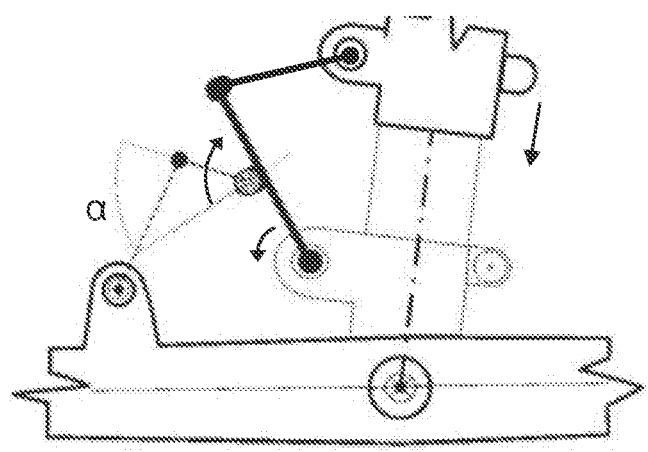

FIG. 11 shows how the positions of the lower arm 428 and first member 488 change with a change of the trail angle (for example due to touchdown of one or more wheels during landing). FIG. 12 shows how the positions of the lower arm 428 and first member 488 change with compression of the shock absorber strut 414. In FIGS. 11 and 12 the change in angle between the lower arm 428 and first member 488 is shown as angle α.

A sensor 492 in the form of a Rotary Variable Displacement Transducer (RVDT) is arranged to sense the angle between the first member 488 and the lower arm 428. The RVDT provides an output signal having a voltage which is proportional to the angle. The control system can thus determine that the link assembly has moved relative to the bogie when there is a change in the voltage of the output signal. In embodiments the first member 488 may be mounted to the lower arm 428 via the RVDT.

In embodiments, the movement detector 432 and control system are calibrated such that the control system can determine the angular position of the bogie relative to the shock absorber strut for a given output signal. The angular position may be made available to other aircraft systems and/or the flight crew.

In embodiments of the method the control system stores the voltage reading, or assigns a zero value to a given voltage, when the aircraft is at a predetermined altitude (and/or predetermined location and/or at a predetermined time). The control system thereafter uses (provided the altitude, location and/or time conditions continue to be met) a change in the voltage away from the stored reading, or zero value, as an indicator that there is aircraft weight on wheels.

Whilst the present invention has been described and illustrated with reference to particular embodiments, it will be appreciated by those of ordinary skill in the art that the invention lends itself to many different variations not specifically illustrated herein. Some examples of such variations will now be described by way of example only.

In an alternative embodiment of the invention there is provided a movement detector similar to that set out in relation to the fourth aspect of the invention, however the RVDT is arranged to sense the angle between the first member and the second member. In an alternative embodiment the RVDT is arranged to sense the angle between the bogie and the second member.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear assembly, the aircraft landing gear assembly comprising:
a shock absorber strut,
a bogie supporting a forward wheel and a rear wheel which is rearward of the forward wheel along a longitudinal direction of the bogie, wherein a joint on the bogie is between the forward and rearward wheel;
a link assembly, and
a movement detector;
wherein the shock absorber strut comprises upper and lower telescoping parts, the upper telescoping part is connectable to the airframe of an aircraft and the lower telescoping part is connected to the joint on the bogie such that the bogie may adopt different pitch angles;
wherein the link assembly extends between the upper and lower telescoping parts, such that relative movement between the upper and lower telescoping parts causes relative movement between parts of the link assembly, and the link assembly includes an upper arm and a lower arm, the upper arm is pivotally connected directly to a point fixed to the upper telescoping part of the shock absorber strut, and the lower arm is pivotally connected directly to both a pivot point fixed to the lower telescoping part of the shock absorber strut and a pivot point fixed to the upper arm;
the link assembly and the bogie have an initial relative position at a given time, and the movement detector is arranged to detect movement of the link assembly relative to the bogie irrespective of the initial relative position of the link assembly and the bogie; and
wherein the movement detector is arranged to detect movement of the lower arm relative to the bogie.

2. The aircraft landing gear assembly according to claim 1, wherein the movement detector is arranged to detect a direction of movement of the link assembly, and the direction of movement of the link assembly is relative to the bogie.

3. The aircraft landing gear assembly according to claim 1, wherein the movement detector is arranged to detect a position of the link assembly relative to the bogie.

4. The aircraft landing gear assembly according to claim 1, wherein the movement detector is arranged to generate a signal in the form of a pulse upon movement of the link assembly relative to the bogie.

5. The aircraft landing gear assembly according to claim 1, wherein the movement detector is arranged to detect a rate of movement of the link assembly relative to the bogie and determine when the rate of movement exceeds a threshold amount.

6. The aircraft landing gear assembly according to claim 1, wherein the upper arm is pivotally connected to the lower arm by an axial pin extending through the upper arm and the lower arm, and the movement detector is connected to the axial pin.

7. The aircraft landing gear assembly according to claim 1, wherein the movement detector comprises a sensor arranged to sense a change in linear displacement of the movement detector, wherein the movement detector is attached to the bogie at a second joint separated from the joint between the bogie and the lower telescoping part, and the linear displacement is dependent on the position of the link assembly relative to the bogie.

8. The aircraft landing gear assembly according to claim 7, wherein the movement detector further comprises a first member slidably mounted to a second member, such that movement of the link assembly relative to the bogie causes a change in the linear displacement of the first member relative to the second member; and
the sensor is arranged to sense the change in the linear displacement of the first member and second member.

9. The aircraft landing gear assembly according to claim 7, wherein the sensor comprises a linear variable displacement transducer.

10. The aircraft landing gear assembly according to claim 1, wherein the movement detector comprises a sensor arranged to sense a change in an angle related to the position of the link assembly relative to the bogie.

11. The aircraft landing gear assembly according to claim 10, wherein the movement detector further comprises:
a member rotatably mounted to the link assembly or the bogie, such that movement of the link assembly relative to the bogie causes a change in an angle of the member relative to the link assembly or the bogie; and
the sensor is arranged to sense the change in the angle of the member relative to the link assembly or the bogie.

12. The aircraft landing gear assembly according to claim 10, wherein the sensor comprises a rotary variable displacement transducer.

13. The aircraft landing gear assembly according to claim 1, wherein the movement detector comprises a signal processor arranged to generate an output indicating whether or not there is aircraft weight on wheels.

14. An aircraft including the landing gear assembly of claim 1.

15. A method of detecting aircraft weight on wheels during a landing of an aircraft, wherein the aircraft comprises a control system and a landing gear assembly; the landing gear assembly comprises: a shock absorber strut, a bogie supporting a forward wheel and a rear wheel, a link assembly, and a movement detector; the shock absorber strut comprises an upper telescoping part and a lower telescoping part, the upper telescoping part is connected to the airframe of an aircraft and the lower telescoping part is connected to a first joint on the bogie between the forward and rear wheels such that the bogie may adopt different pitch angles; the link assembly extends between the upper and lower telescoping parts, such that relative movement between the upper and lower telescoping parts causes relative movement between parts of the link assembly, and the link assembly includes an upper arm and a lower arm, the upper arm is pivotally connected directly to a point fixed to the upper telescoping part of the shock absorber strut, and the lower arm is pivotally connected directly to both a pivot point fixed to the lower telescoping part of the shock absorber strut and a pivot point fixed to the upper arm;

the method comprising:

the link assembly adopting an initial position relative to the bogie after the landing gear assembly has been deployed for landing and before the aircraft has touched down;

the link assembly moving relative to the bogie during touchdown of the at least one wheel;

the movement detector detecting the movement of the link assembly relative to the bogie, irrespective of the initial position of the link assembly relative to the bogie, wherein the movement detector is attached to the link assembly and to a second joint on the bogie spaced from the first joint in a longitudinal direction of the bogie;

the control system receiving a signal from the movement detector in response to the detection of the movement; and the control system determining, on the basis of the signal, that there is aircraft weight on the at least one of the forward wheel and the aft wheel.

16. The method according to claim 15, wherein:

the movement detector is arranged to detect the position of the link assembly relative to the bogie;

the signal received by the control system comprises an indication of the position of the link assembly relative to the bogie; and the determination by the control system whether there is aircraft weight on the at least one wheel is made in response to the control system determining that the signal indicates a change in the position of the link assembly relative to the bogie from the initial position.

17. The method according to claim 16, wherein the method further comprises zeroing the movement detector such that the initial position of the link assembly relative to the bogie corresponds to a zero value.

18. The method according to claim 15, wherein the movement detector comprises:

a first member connected to the link assembly and a second member connected both to the first member and to a second joint on the bogie which is separated from the joint between the bogie and the lower telescoping part, wherein relative movement between the link assembly and the bogie causes relative movement between the first and second members relative, and a sensor that is either a linear variable differential transformer or a rotary variable differential transformer;

wherein the step of the movement detector detecting the movement of the link assembly relative to the bogie comprises the sensor sensing relative movement of one of the two members relative to the other and/or relative movement of one of the two members relative to the bogie or link assembly.

19. A method of determining a rate of descent of an aircraft upon landing, wherein the aircraft comprises a control system and a landing gear assembly, the landing gear assembly comprising: a shock absorber strut, a bogie supporting a front wheel and a rear wheel, a link assembly, and a movement detector; wherein the shock absorber strut comprises an upper telescoping part and a lower telescoping part, the upper telescoping part is connected to the airframe of the aircraft and the lower telescoping part is connected to a first joint on the bogie between the front wheel and the rear wheel along a longitudinal direction of the bogie, wherein the bogie adopts different pitch angles with respect to the lower telescoping part, and the link assembly extends between the upper telescoping part and the lower telescoping part such that relative movement between the upper and lower telescoping parts causes relative movement between parts of the link assembly, wherein the link assembly includes an upper arm and a lower arm, the upper arm is pivotally connected directly to a point fixed to the upper telescoping part of the shock absorber strut, and the lower arm is pivotally connected directly to both a pivot point fixed to the lower telescoping part of the shock absorber strut and a pivot point fixed to the upper arm;

the method comprising:

the link assembly moving relative to the bogie during landing;

the movement detector detecting a speed of the movement of the link assembly relative to the bogie, wherein the movement detector is attached to the link assembly and to a second joint on the bogie spaced from the first joint in a longitudinal direction of the bogie;

the control system receiving a signal from the movement detector, the signal is indicative of the speed of the movement; and the control system determining, on the basis of the signal, the rate of descent of the aircraft upon landing.

* * * * *